United States Patent Office 2,953,566
Patented Sept. 20, 1960

2,953,566

PROCESS FOR THERAPEUTIC COMPOUNDS

Armiger H. Sommers, Lake Forest, Ill., assignor to Abbott Laboratories, North Chicago, Ill., a corporation of Illinois No Drawing. Filed Oct. 17, 1957, Ser. No. 690,636

8 Claims. (Cl. 260—256.4)

This invention relates to a novel process for the synthesis of non-toxic addition salts of 1-(2-dilower-alkyl-aminoethyl)-5-ethyl-5-phenylbarbituric acids.

The basic compounds from which the desired salts are derived have the general formula

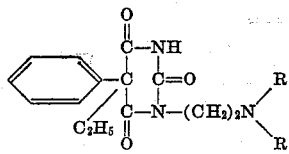

where R is lower alkyl. These barbiturates have antiarrythmic properties, as well as atropinic properties and in the past these compounds have been prepared by reacting equivalent amounts of phenobarbital sodium and a dialkylaminoalkyl halide, and converting the viscous base thus produced to the hydrochloride salt. This process usually leads to the formation of a considerable amount of the undesired N,N'-disubstituted product.

It is an object of this invention to provide a process whereby 1-(2-dialklyaminoethyl)-5-ethyl - 5 - phenylbarbituric acids are produced by the reaction of phenobarbital acid and a dialkylaminoethyl halide in a non-polar, aromatic, hydrocarbon solvent.

It is also an object of this invention to provide a process which will produce 1-(2-dialklyaminoethyl)-5-ethyl-5-phenylbarbituric acids in high yields.

It has now been found that by heating phenobarbital acid with an equivalent amount of a dialkylaminoethyl halide such as dialkylaminoethyl chloride, or a small excess thereof, in a non-polar, aromatic, hydrocarbon solvent such as benzene, xylene or toluene, one may obtain a much higher yield of the desired N-monosubstituted product which may be isolated as the hydrochloride salt directly.

The following examples further illustrate this invention but it should be understood that such are not intended to limit the scope of the invention in any way.

EXAMPLE I 1-(2-diethylaminoethyl)-5-ethyl-5-phenylbarbituric acid hydrochloride

A mixture of 116 grams of 5-ethyl-5-phenylbarbituric acid and one liter of anhydrous benzene is heated with stirring and is refluxed while a solution of 77 grams of 2-diethylaminoethyl chloride dissolved in an equal weight of xylene is added during a period of one hour. The mixture is stirred and heated under reflux for an additional 20 hours and is then allowed to cool to room temperature. The thick suspension which results is then filtered by suction and the resulting white solid is washed on the funnel with acetone. After drying, this solid is dissolved in 800 ml. of boiling methanol, and upon cooling, there is obtained 90 grams of the product in the form of white crystals, melting point 252° C. Concentrating the filtrate to 250 ml. and cooling gives a second crop of crystals also melting at 252° C. which weighs 26 grams. Total collected product is 116 grams (64%).

EXAMPLE II 1-(2-diethylaminoethyl)-5-ethyl-5-phenylbarbituric acid hydrochloride The same procedure is followed as described in Example I except that one liter of toluene is used instead of the liter of benzene. The above-named product is collected in a yield of 52%.

EXAMPLE III 1-(2-diethylaminoethyl)-5-ethyl-5-phenylbarbituric acid hydrochloride The same procedure is followed as described in Example I except that one liter of xylene is used instead of the liter of benzene.

EXAMPLE IV 1-(2-dimethylaminoethyl)-5-ethyl-5-phenylbarbituric acid hydrochloride A mixture of 58 grams of 5-ethyl-5-phenylbarbituric acid and 500 ml. of benzene is heated and stirred under reflux. During this period of reflux, a solution of 30 grams of 2-dimethylaminoethyl chloride dissolved in an equal weight of xylene is added. The mixture is stirred and heated for 16 hours after the addition is completed. The resulting suspension is cooled and filtered and the solid is washed with acetone, dried and recrystallized from 350 ml. of methanol, to obtain 55 grams of the product in the form of white crystals which melt at 256° C. The above-named product is collected in a yield of 62%.

EXAMPLE V 1-(2-diethylaminoethyl)-5-ethyl-5-phenylbarbituric acid hydrochloride

A mixture of 300 grams of 5-ethyl-5-phenylbarbituric acid in 1.5 liters of benzene is stirred and refluxed for one hour. A freshly prepared solution of 200 grams of diethylaminoethyl chloride in 200 grams of benzene is added over a period of five minutes and the mixture is stirred and heated for about 18 hours. It is then allowed to cool and is filtered with suction and the solid washed on the filter with about 0.5 liter of acetone. This solid after drying is recrystallized from two liters of methanol and a total of 279 grams (58%) of the crystalline hydrochoride salt of the product is obtained.

EXAMPLE VI 1-(2-diethylaminoethyl)-5-ethyl-5-phenylbarbituric acid

The hydrochloride salt of 1-(2-diethylaminoethyl)-5-ethyl-5-phenylbarbituric acid is treated with sodium hydroxide in excess, and the free base 1-(2-diethylaminoethyl)-5-ethyl-5-phenylbarbituric acid, is liberated as an oil which is extracted in ether. Evaporation of the ether affords the product as a very viscous oil.

Others may practice the invention in any of the numerous ways which will be suggested to one skilled in the art upon a reading of this specification. It is intended that all such practice of the invention be included hereunder provided it falls within the scope of the appended claims.

I claim:

1. The process for the preparation of a compound represented by the formula

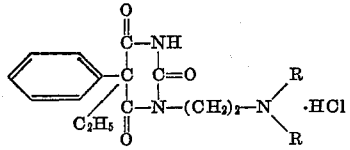

where R is lower alkyl, which consists essentially of heating and refluxing a mixture of phenobarbital acid in a non-polar, aromatic, hydrocarbon solvent selected from the group consisting of benzene, a monoalkyl-substituted benzene and a polyalkyl-substituted benzene wherein the alkyl chain is comprised of from 1–3 carbon atoms inclusive, adding a diloweralkylamino ethyl chloride dissolved in a non-polar, aromatic, hydrocarbon solvent selected from the group consisting of benzene, a monoalkyl-substituted benzene and a polyalkyl-substituted benzene wherein the alkyl chain is comprised of from 1–3 carbon atoms inclusive, refluxing the mixture until reaction is complete, and cooling the resulting suspension to isolate the solid product.

2. The process for the preparation of a compound with the general formula

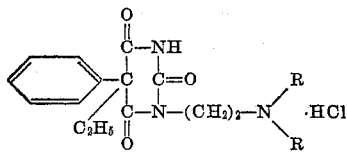

where R is lower alkyl, which consists essentially of refluxing a solution of phenobarbital acid in benzene, adding a solution of dilower alkylamino ethyl chloride dissolved in benzene, heating the resulting mixture under reflux, cooling to room temperature and filtering the resulting suspension to collect the solid product.

3. The process for the preparation of 1-(2-diethylaminoethyl)-5-ethyl-5-phenylbarbituric acid which consists essentially of refluxing a mixture of 5-ethyl-5-phenylbarbituric acid and benzene, adding a solution of diethylaminoethyl chloride dissolved in xylene, heating the resulting mixture under reflux, cooling to room temperature and filtering the resulting suspension to collect the solid hydrochloride salt.

4. The process for the preparation of 1-(2-diethylaminoethyl)-5-ethyl-5-phenylbarbituric acid which consists essentially of refluxing a mixture of 5-ethyl-5-phenylbarbituric acid, diethylaminoethyl chloride and benzene for sufficient time to allow completion of the reaction and then isolating the solid hydrochloride salt.

5. The process for the preparation of 1-(2-dimethylaminoethyl)-5-ethyl-5-phenylbarbituric acid which consists essentially of heating and refluxing a solution of 5-ethyl-5-phenylbarbituric acid and benzene, adding to this resulting mixture a solution of dimethylaminoethyl chloride dissolved in xylene, heating the resulting mixture under reflux for about 20 hours, cooling to room temperature and filtering the resulting suspension to collect the solid hydrochloride salt.

6. The process for the preparation of 1-(2-diethylaminoethyl)-5-ethyl-5-phenylbarbituric acid which consists essentially of heating and refluxing a solution of 5-ethyl-5-phenylbarbituric acid and toluene, adding to this resulting mixture a solution of diethylaminoethyl chloride dissolved in xylene, heating the resulting mixture under reflux for about 20 hours, cooling to room temperature and filtering the resulting suspension to collect the solid hydrochloride salt.

7. The process for the preparation of the free base of 1-(2-diethylaminoethyl)-5-ethyl-5 - phenylbarbituric acid which comprises treating the hydrochloride salt of 1-(2-diethylaminoethyl) - 5 - ethyl - 5 - phenylbarbituric acid with an excess of sodium hydroxide and liberating the resulting base.

8. A process for the preparation of compounds represented by the formula:

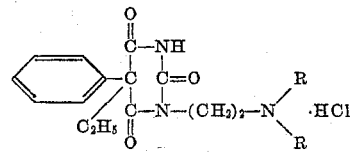

where R is lower alkyl, which consists essentially of refluxing phenobarbital and a diloweralkylaminoethyl chloride in a non-polar, aromatic, hydrocarbon solvent selected from the group consisting of benzene, a monoalkyl-substituted benzene and a polyalkyl-substituted benzene wherein the alkyl chain is comprised of from 1–3 carbon atoms inclusive, and recovering the precipitated product.

References Cited in the file of this patent
UNITED STATES PATENTS 2,842,547  Chiti et al. _____ July 8, 1958
2,883,381  Schusteritz _____ Apr. 21, 1959

OTHER REFERENCES

Chiti et al.: Il Farmaco, vol. IX–fasc. II, Ed Sci., pp. 617–625.

Archiwum: Chemji and Farmacji, vol. 11, pp. 1–8 (1934).